United States Patent [19]

Sonohara

[11] Patent Number: 5,712,955
[45] Date of Patent: Jan. 27, 1998

[54] METHOD AND APPARATUS FOR ENCODING DIGITAL SIGNAL, METHOD AND APPARATUS FOR DECODING DIGITAL SIGNAL, AND RECORDING MEDIUM FOR ENCODED SIGNALS

[75] Inventor: Mito Sonohara, Kanagawa, Japan

[73] Assignee: Sony Corporation, Tokyo, Japan

[21] Appl. No.: 392,733

[22] PCT Filed: Jun. 27, 1994

[86] PCT No.: PCT/JP94/01034

§ 371 Date: Mar. 27, 1995

§ 102(e) Date: Mar. 27, 1995

[87] PCT Pub. No.: WO95/01633

PCT Pub. Date: Jan. 12, 1995

[30] Foreign Application Priority Data

Jun. 30, 1993 [JP] Japan .................. 5-183321

[51] Int. Cl.$^6$ .................................................. G10L 9/00
[52] U.S. Cl. .................. 395/2.38; 341/67; 348/403; 348/421; 358/433
[58] Field of Search .................. 395/2.38, 2.91, 395/2.92, 2.94, 2.95; 375/240, 241, 200; 348/384, 398, 400, 403, 409, 410, 420, 421; 358/426, 261.1, 427, 432, 433; 370/203, 210, 465, 470, 477; 341/51, 67, 76

[56] References Cited

U.S. PATENT DOCUMENTS

| | | | |
|---|---|---|---|
| 5,264,846 | 11/1993 | Oikawa | 341/76 |
| 5,309,232 | 5/1994 | Hartung et al. | 348/384 |
| 5,367,608 | 11/1994 | Veldhuis et al. | 395/2.38 |
| 5,375,189 | 12/1994 | Tsutsui | 395/2.38 |
| 5,388,209 | 2/1995 | Akagiri | 395/2.38 |
| 5,414,795 | 5/1995 | Tsutsui et al. | 395/2.13 |

FOREIGN PATENT DOCUMENTS

| | | | |
|---|---|---|---|
| 59-21039 | 5/1984 | Japan | G10L 1/00 |
| 59-129900 | 7/1984 | Japan | G10L 1/00 |
| 3-184099 | 8/1991 | Japan | G10L 9/18 |
| 4-74018 | 3/1992 | Japan | H03M 7/40 |

OTHER PUBLICATIONS

Hoogendoorn, A., "Digital Compact Cassette", Proceedings of the IEEE, vol. 82, No. 10, Oct. 1994.

*Primary Examiner*—Alpus H. Hsu
*Attorney, Agent, or Firm*—Limbach & Limbach L.L.P.; Seong-Kun Oh

[57] ABSTRACT

An encoding apparatus for encoding a digital signal and a decoding apparatus for decoding the encoded signal.

This encoding apparatus comprises a time series sample buffer for dividing an input signal into blocks, an orthogonal transform encoding section for transforming the signals every blocks into spectrum signals, and an entropy encoding section for implementing variable length encoding to all or a portion of the spectrum signals every blocks. At the entropy encoding section, there are provided an upper limit setting circuit for setting upper limit in the number of bits per each block of a signal encoded and outputted, and a bit number judging circuit for stopping outputting of a portion of spectrum signals in a block or blocks where the number of bits above the upper limit is required. The number of bits per each block is caused to have upper limit to stop recording or transmission of a portion of spectrum signals in a block or blocks where the number of bits above the upper limit is required. Thus, quantity of information caused to undergo encoding, recording or transmission and decoding can be reduced.

38 Claims, 7 Drawing Sheets

METHOD AND APPARATUS FOR ENCODING DIGITAL SIGNAL, METHOD AND APPARATUS FOR DECODING DIGITAL SIGNAL, AND RECORDING MEDIUM FOR ENCODED SIGNALS

TECHNICAL FIELD

This invention relates to an encoding method and an encoding apparatus for encoding a digital signal such as speech signal, acoustic signal or picture signal, etc., a decoding method and a decoding apparatus for decoding a signal encoded by such encoding method or apparatus, and a recording medium on which encoded signals encoded by such encoding method or apparatus are recorded.

BACKGROUND ART

Hitherto, a transform encoding system using a so called spectrum transform, as a type of efficient encoding systems for efficiently bit-compressing a time series sample data signal such as an audio signal, etc., to encode bit-compressed signal, is known. This transform encoding system spectrum transforms an input signal in block units to encode transformed spectrum signals. Discrete Cosine Transform (DCT) processing is the representative spectrum transform processing. In this transform encoding system, a block distortion such that a discontinuous adjoining (connecting) portion between the blocks is felt as problematic noise. In order to lessen such block distortion, the end portions of such blocks are generally allowed to overlap with adjacent blocks. Here, a so called Modified Discrete Cosine Transform (MDCT), or Improved Discrete Cosine Transform (IMDCT) which is the inverse transform processing thereof, is performed such that double transmission with respect to samples at the overlapping portion is not carried out while allowing an arbitrary block to overlap with blocks adjoining in both directions thereof respectively by halves (half blocks), and is therefore suitable for efficient encoding.

Encoding and Decoding using such MDCT and IMDCT is disclosed in, e.g., Mochizuki, Yano, Nishitani "Filter Constraints of Plural Block Size Mixed MDCT", Technical Research Report of Institute of Electronics and Communication Engineers of Japan, CAS 90-10, DSP 90-14, pp. 55–60, or Hazu, Sugiyama, Iwatare, Nishitani "Adaptive block length Adaptive Transform Coding using MDCT (ATC-ABS)" Society of Electronics and Information Communication Engineers of Japan Spring National Meeting Lecture Collection of 1990, A-197. etc. The MDCT and the IMDCT mentioned above will be briefly described below with reference to FIG. 7.

In FIG. 7, an arbitrary block of time series sample data, e.g., the J-th block, has portions overlapping with the (J−1)-th block and the (J+1)-th block respectively by halves (50%). When the number of samples of the J-th block is assumed to be N (N is natural number), the J-th block has overlap of N/2 samples between the J-th block and the (J−1)-th block, and also has overlap of N/2 samples between the J-th block and the (J+1)-th block. Preprocessing filter or window Wh for transform is applied to these respective blocks, e.g., an arbitrary J-th block input time series sample 101 to obtain N (number of) time series data 102.

As with the characteristic of the pre-processing filter or the window Wh for transform, a characteristic where the degree of power concentration of transform data is maximum is selected in correspondence with the statistical property of an input signal. By implementing linear transform processing of MDCT to the time series data 102 of N samples, N/2 (i.e., one half of the number of input samples) independent spectrum data 103 are obtained on a frequency base. By implementing processing of linear inverse transform of IMDCT to the N/2 spectrum data 103, N time series data 104 is obtained. Synthesis filter or window Wf for inverse transform is applied to the time series data 104 to obtain time series data 105 thereafter to add it to output results of blocks before and after to restore (reconstruct) original input time series sample data.

In the conventional efficient encoding system, a method of re-quantizing spectrum data 103 obtained as described above by taking into the characteristic from a view point of the hearing sense to record or transmit re-quantized data has been adopted. In addition, as in the ISO 11172-3 of the ISO standard, entropy encoding such that short and long codes are respectively allocated to data of higher frequency and data of lower frequency in dependency upon occurrence frequency is implemented to all or a portion of these spectrum data. Thus, high efficiency is achieved.

However, in the case where entropy encoding is implemented in this way, the number of bits required for every respective block of time series sample data is variable, and the upper limit of the number of bits thereof cannot be recognized until an input signal is actually encoded. For this reason, not only are encoding and decoding at a fixed bit rate difficult, but also, the scale of hardware is large.

SUMMARY OF THE INVENTION

This invention has been proposed in view of actual circumstances as described above, and its object is to provide an encoding method and an encoding apparatus which can realize reduction of redundancy and more efficient encoding, a decoding method and a decoding apparatus corresponding thereto, and a recording medium for recording encoded signals.

An encoding method according to this invention proposed in order to attain the above-mentioned object is directed to an encoding method comprising the steps of dividing an input signal into blocks, transforming every respective block of the input signal into spectrum signals, implementing variable length encoding to all or a portion of every block of these spectrum signals to output encoded signals, wherein the number of bits per each block of a signal which is encoded and outputted, and which will be recorded or transmitted later is caused to have an upper limit, thus to stop outputting of a portion of the spectrum signals in a block or blocks where the number of bits above the upper limit is required.

Moreover, in accordance with the encoding method of this invention, the upper limit of the number of bits of a signal encoded and outputted is set per plural blocks of the input signal, thus to stop outputting of a portion of spectrum signal in a block or blocks where the number of bits above the upper limit is required.

Here, the encoding method of this invention carries out a processing as described below. Namely, in transform processing from the input signal to spectrum signals, the input signal is divided into signals in a plurality of frequency bands to carry out transform processing into every respective band of the spectrum signals. The input signal is divided into signals in a plurality of bands of which respective bandwidths are not uniform to carry out transform processing into every respective bands of the spectrum signals. For transform processing from the input signal to spectrum signals, Modified Discrete Cosine Transform (MDCT) processing is used.

The spectrum signals of respective blocks are spectrum signals divided into a plurality of units and normalized at every respective units. Selection of the spectrum signal or signals of which outputting is stopped is carried out in dependency upon the shape of spectrum signals of the blocks. In selection of the spectrum signal or signals of which outputting is stopped, such a selection is carried out from a higher frequency band side of all spectrum signals. Entropy code is used as the variable length code. For the variable length code, block Huffman code is used. A plurality of code tables of the variable length codes are prepared to select a code table where the number of bits required for encoding becomes minimum in respective blocks to output spectrum signals along with a discrimination signal of the selected code table.

Moreover, an encoding apparatus according to the present invention realizes the above-described encoding method.

On the other hand, a decoding method of this invention decodes a signal encoded by the above-described encoding method.

Further, a recording medium of this invention is adapted so that signals encoded by the above-described encoding method are recorded.

In other words, in order to solve the above-described problems, this invention adopts a scheme to determine the upper limit of the number of bits after having undergone encoding with respect to each block of the input signal to stop recording or transmission of spectrum signals in a block or blocks where the number of bits above the upper limit is required to thereby fix the upper limit of the necessary number of bits, thus making it possible to carry out processing at a fixed bit rate, and to hold down (suppress), to some extent, the scale of hardware also at a variable bit rate.

Moreover, an approach is employed to select spectrum signals which are not subjected to recording or transmission in the order from a higher frequency band side, thereby minimizing influence from a viewpoint of the hearing sense.

Further, it is conceivable to combine plural methods such as a method in which the setting of the upper limit of the number of bits is carried out in plural block units, or, a method in which a plurality of code trains in entropy encoding to select a code table where the necessary number of bits becomes minimum at each block, and/or other methods.

In accordance with this invention, in dividing the input signal into blocks to transform each block of the input signal into spectrum signals to implement variable length encoding to all or a portion of each block of the spectrum signals to record or transmit them, the number of bits per each block of the encoded signal which will be recorded or transmitted later is caused to have an upper limit to stop recording or transmission of a portion of the spectrum signals in a block or blocks where the number of blocks above the upper limit is required. Thus, the quantity of information encoded, recorded, or transmitted and decoded thereafter can be lessened. Accordingly, redundancy can be reduced. In addition, such information is recorded, thereby making it possible to record greater quantity of information onto or into a recording medium.

DETAILED DESCRIPTION OF THE INVENTION

Preferred embodiments of this invention will now be described with reference to the attached drawings.

An encoding method of the embodiment according to this invention is fundamentally directed to an encoding method comprising the steps of dividing an input signal into blocks, transforming every block of the input signal into spectrum signals, implementing variable length encoding to all or a portion of each block of the spectrum signals, wherein the number of bits per each block of an encoded signal which is recorded or transmitted later is caused to have an upper limit to stop outputting of a portion of spectrum signals in a block or blocks where the number of bits above the upper limit is required.

Figure 1:
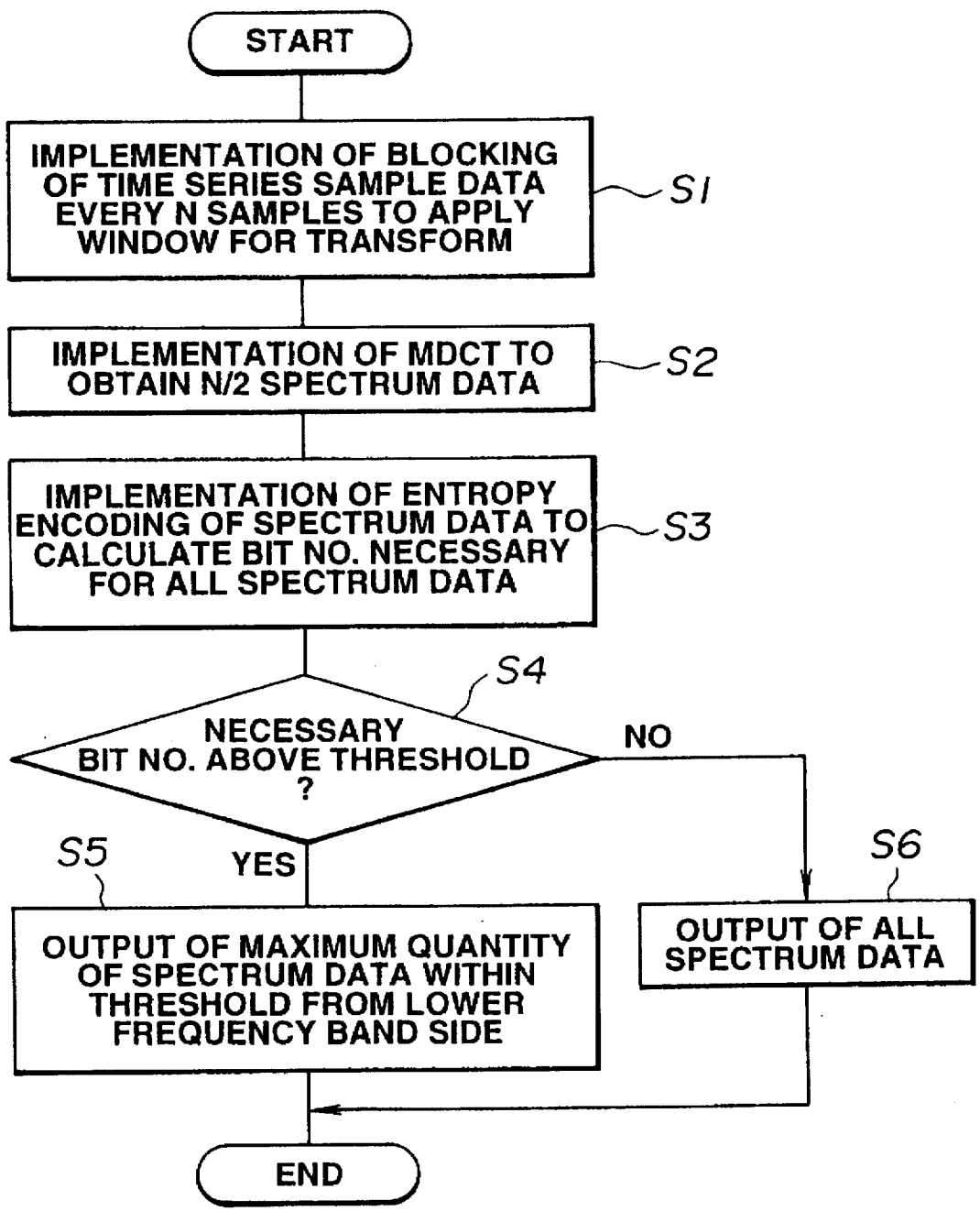
FIG. 1 is a flowchart showing an outline of a signal encoding method according to this invention.

Outline of a signal transforming procedure for encoding, e.g., PCM audio data, etc., by the encoding method of the embodiment according to this invention is shown in FIG. 1.

Figure 7:
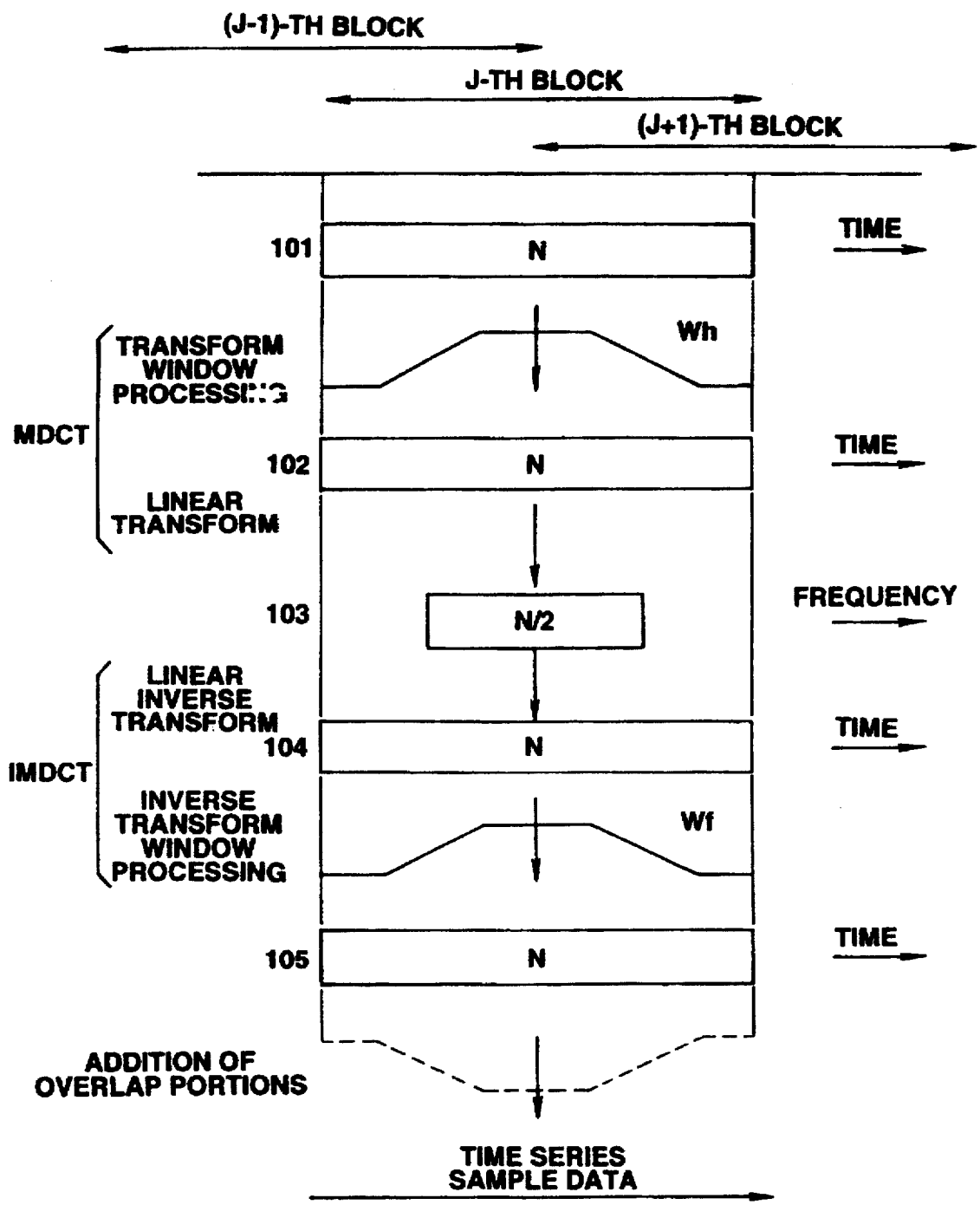
FIG. 7 is a view for explaining an outline of the processing procedure of MDCT and IMDCT.

At the first step S1 shown in FIG. 1, time series sample data, e.g., PCM audio data, etc., is divided into blocks (subjected to blocking) at every predetermined number of samples (N samples in this example). Namely, as indicated by the FIG. 7 previously mentioned, respective blocks are set so that overlap quantity between adjacent blocks becomes equal to 50%, i.e., so that they overlap with each other by N/2 samples, and the previously described window Wh for transform as shown in the FIG. 7 is applied to sample data of the J-th block of this time series data. At the subsequent step S2, MDCT is implemented thereto. Thus, N/2 (number of) spectrum data are obtained.

At the subsequent step S3, all or a portion of the N/2 spectrum data are entropy-encoded to calculate the number of bits required for recording or transmitting all of the spectrum data.

At the subsequent step S4, it is determined whether the number of bits is above a threshold of the number of bits set in advance. As a result, in the case where the former is above the latter (Yes), the processing operation proceeds to step S5. In contrast, in the case where the former is not above the latter (No), the processing operation proceeds to step S6. At step S5, for a range where the number of bits of spectrum data to be recorded is not above threshold, spectrum data in which all or a portion thereof are entropy-encoded are outputted in the order from a lower frequency band side. Thus, processing is completed. On the contrary, at the step S6, all spectrum data in which all or a portion thereof are entropy-encoded are outputted. Thus, processing is completed.

Figure 2:
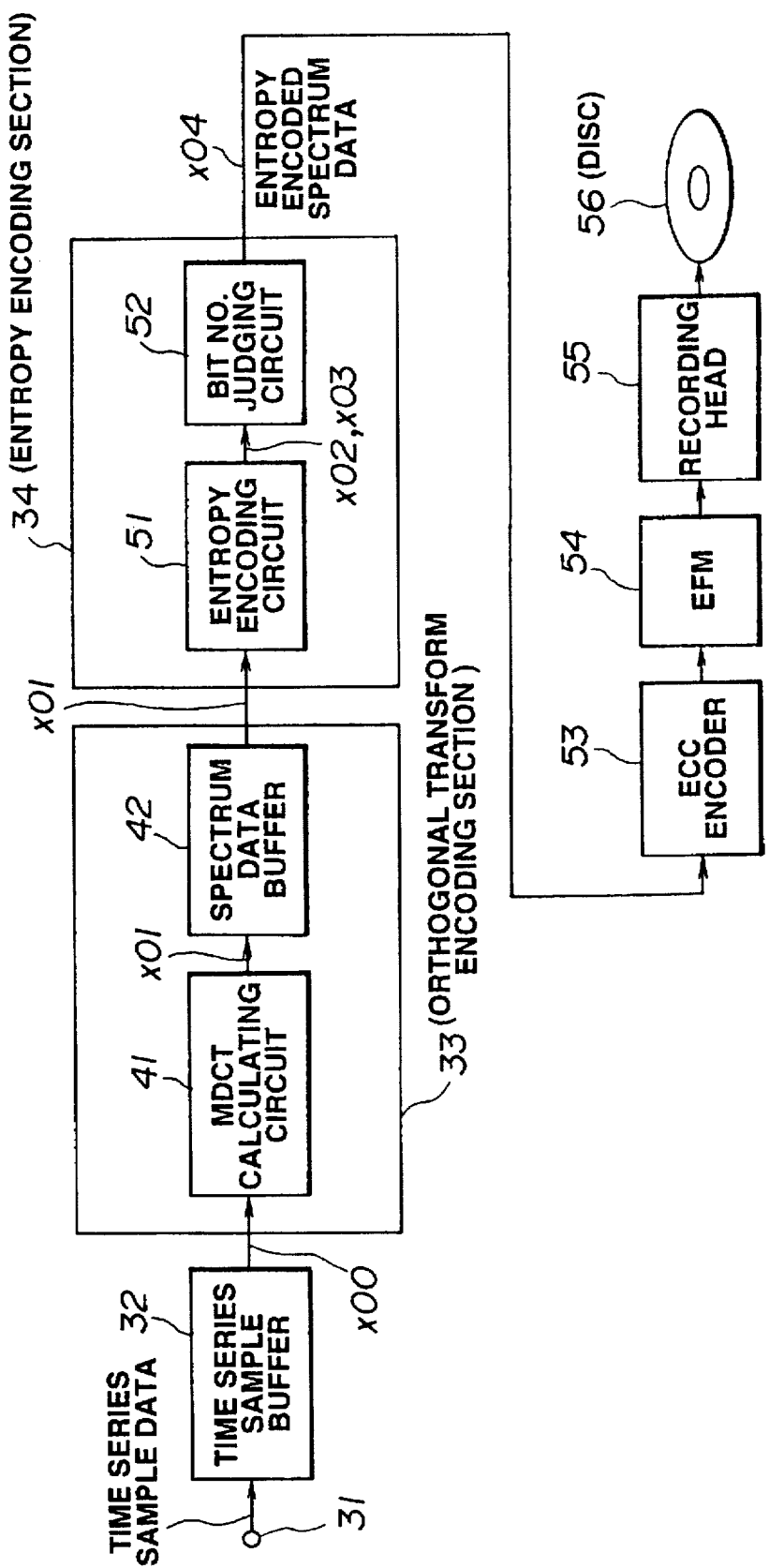
FIG. 2 is a circuit diagram showing, in a block form, the configuration for realizing the signal encoding method according to this invention.

FIG. 2 shows an example of configuration of hardware (encoding apparatus) for realizing the above-described encoding method.

The encoding apparatus of this embodiment comprises time series sample buffer 32 for carrying out processing of step S1 of FIG. 1 as blocking means for blocking an input signal, an orthogonal transform encoding section 33 for carrying out processing of step S2 of FIG. 1 as transforming means for transforming every respective block of the signals into spectrum signals, and an entropy encoding section 34 for carrying out processing of steps S3, S4, S5, S6 of FIG. 1 as variable length encoding means for implementing variable length encoding to all or a portion of every respective portion of the spectrum signals. At the entropy encoding section 34, there is provided a bit number judging circuit 52 serving as upper limit setting means for setting the upper limit in the number of bits per each block of the signal encoded and outputted, and output stopping means for stopping outputting of a portion of the spectrum signals in a block or blocks where the number of bits above the upper limit is required.

In FIG. 2, time series sample data delivered through an input terminal 31 is sent to a time series sample buffer 32, and is stored therein. N (number of) time series sample data x00 stored in the time series sample buffer 32 is caused to undergo application of window for transform, and is then subjected to MDCT processing by a MDCT calculating circuit 41 the of orthogonal transform encoding section 33. Thus, such data is transformed into N/2 spectrum data x01. This spectrum data x01 is sent to the entropy encoding section 34 of the succeeding stage. It should be noted that quantization may be implemented upon the output of the MDCT calculating circuit At the entropy encoding section 34, the N/2 spectrum data is entropy-encoded by an entropy encoding circuit 51 resulting in an entropy-encoded signal x02. Then, the entropy encoded signal x02 is sent to a bit number judging circuit 52 along with a bit number (signal) x03 required for the entropy encoded spectrum data. This bit number judging circuit 52 judges whether or not the bit number x03 is above the threshold set in advance, when the former is above the latter, to output maximum quantity of entropy encoded spectrum data X04 within a range which is not above the threshold from a lower frequency band side of spectrum data. On the other hand, in the case where the bit number x03 is not above the threshold, the signal x02 itself is outputted as the entropy-encoded spectrum data x04.

This outputted spectrum data x04 will be recorded or transmitted later. For example, an ECC encoder 53 adds error correction code to the spectrum data x04. Output from the ECC encoder 53 is modulated by an EFM circuit 54, and is then delivered to a recording head 55. The recording head 55 records the encoded data train outputted from the EFM circuit 54 onto a disc 56.

It is to be noted that the above-described entropy encoding may be implemented to all of the spectrum data, or may be implemented to a portion thereof. Moreover, the threshold of the number of bits may be set with respect to plural blocks to carry out the above-mentioned processing in a block or blocks where the number of bits is above the threshold. Further, in order to carry out more efficient encoding, there may be employed in combination a method in which a plurality of code tables of entropy encoding are provided to select a code table where necessary number of bits is minimum in respective blocks to record or transmit encoded spectrum data along with an ID of that code table, or the like. Such entropy encoding is not particularly limited.

Further, recording medium of this invention is adapted so that encoded signals obtained by the encoding apparatus to which the above-described encoding method is applied are recorded thereon or therein. There may be employed, as this recording medium, various recording media including disc-shaped recording medium such as so called hard disc, etc., tape shaped recording medium, the above-described disc-shaped optical recording medium 56 including magneto-optical recording medium, or phase change recording medium, semiconductor memory, and recording medium such as so called IC card, etc.

Figure 3:
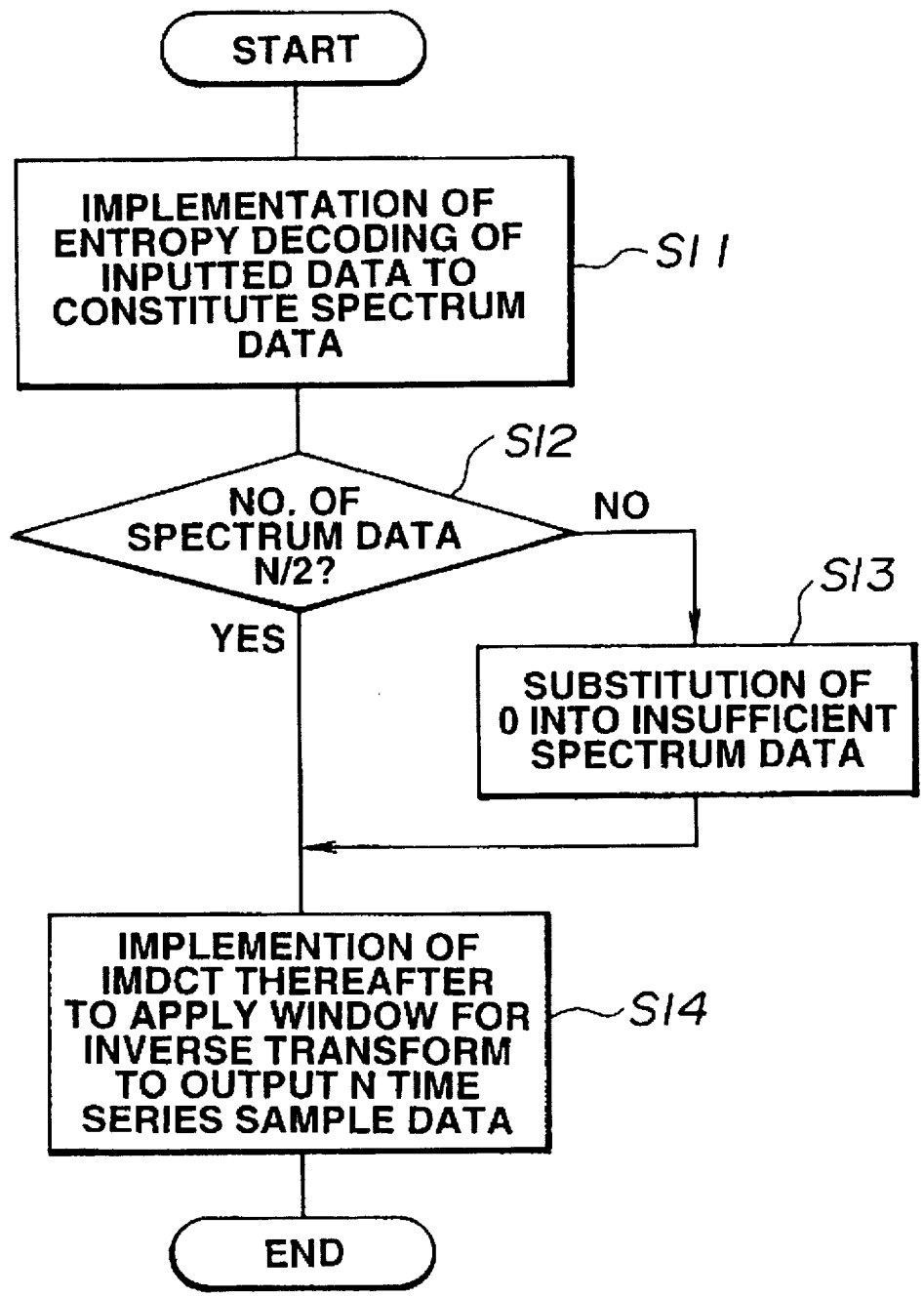
FIG. 3 is a flowchart showing an outline of a signal decoding method according to this invention.

The outline of the signal transforming procedure in a decoding method of an embodiment according to this invention corresponding to the above-described encoding method of the embodiment according to this invention is shown in FIG. 3.

The decoding method of this embodiment is basically directed to a decoding method for decoding a signal encoded by the encoding method comprising the steps of dividing an input signal into blocks, transforming every block of the signal into spectrum signals, wherein in implementing variable length encoding to all or a portion of each block of the spectrum signals, the number of bits per each block of an outputted signal is caused to have an upper limit to stop outputting of a portion of spectrum signals in a block or blocks where the number of bits above the upper limit is required, the decoding method comprising the steps of implementing inverse variable length encoding to the variable length encoded signals every blocks, inversely transforming spectrum signals obtained by the inverse variable length encoding into time series data every blocks, and releasing the blocks of the time series data to obtain a decoded signal.

At the first step S11 shown in FIG. 3, the input data directly from the above-described encoder or from package media where the input data is recorded, or transmitted from communication means, or the like is entropy-decoded to constitute a spectrum data.

At the subsequent step S12, it is determined whether the number of the spectrum data is equal to the number of N/2 of spectrum data before having undergone recording or transmission. In the case where the number of spectrum data is insufficient (No), the processing operation proceeds to step S13. In the case where the number of spectrum data is sufficient (Yes), the processing operation proceeds to the subsequent step S14.

At the step S13, insufficient spectrum data is caused to be 0 (zero). Thereafter, the processing operation proceeds to step S14.

At the last step S14, IMDCT is implemented to spectrum data to apply a window for inverse transform thereto to output N (number of) time series sample data. Thus, processing is completed.

It should be noted that values except for 0 may be employed and a plurality of values considered to have the smallest influence from a viewpoint of the hearing sense may be employed as the value for replacing the insufficient spectrum data.

Figure 4:
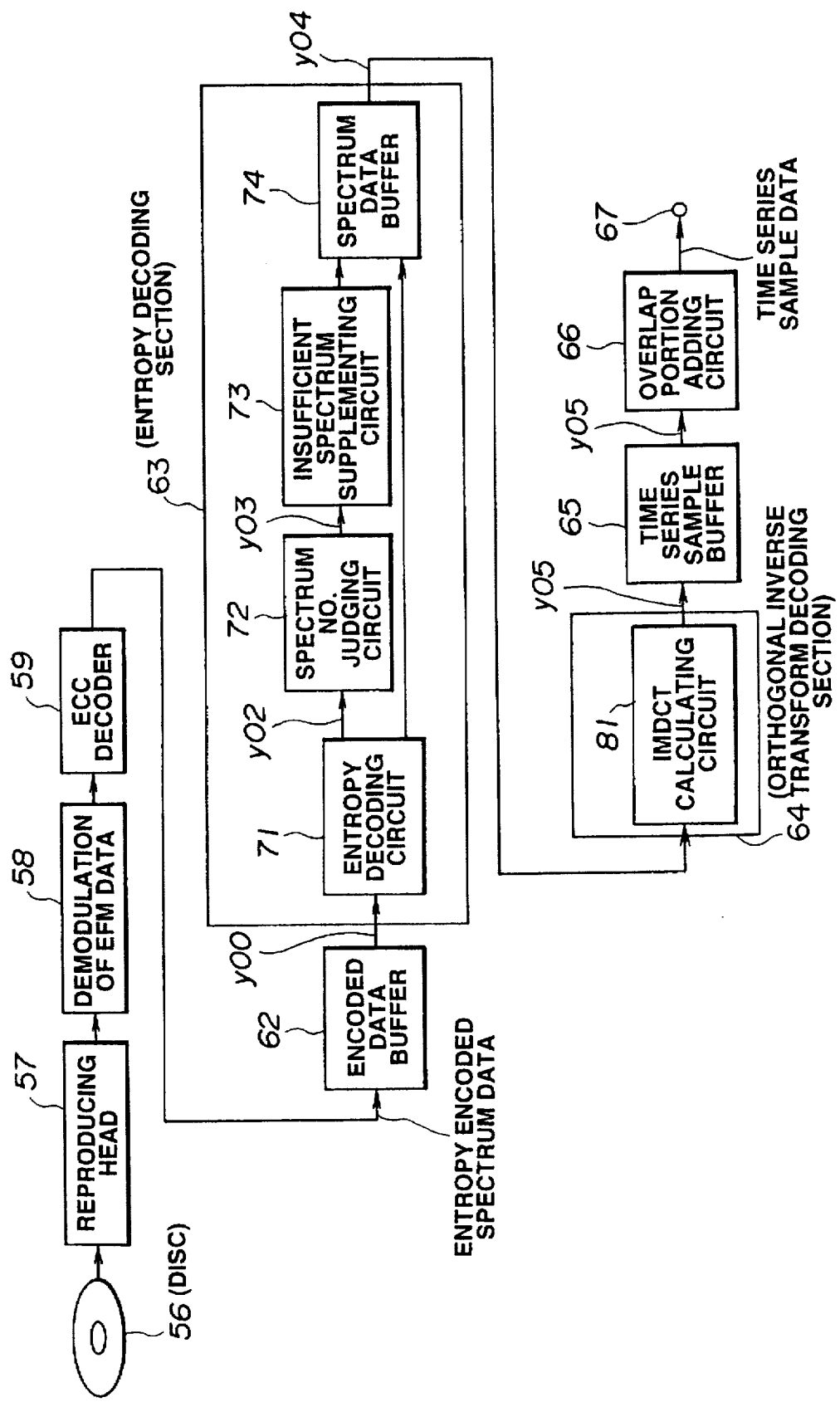
FIG. 4 is a circuit diagram showing, in a block form, the configuration for realizing the signal decoding method according to this invention.

FIG. 4 shows an example of a hardware (decoding apparatus) configuration for realizing the above-described decoding method.

The decoding apparatus of this embodiment is directed to a decoding apparatus adapted for decoding an encoded signal reproduced from the recording medium where there is recorded a signal encoded by the above-described encoding apparatus adapted for dividing the input signal into blocks to transform every block of the signal into spectrum signals, wherein in implementing variable length encoding to all or a portion of each block of the spectrum signals to output them, the number of bits per each block of an outputted signal is caused to have an upper limit to stop outputting of a portion of spectrum signals in a block or blocks where the number of bits above the upper limit is required; or encoded signal is directly transmitted, the decoding apparatus comprising an entropy decoding section 63 for carrying out processing of steps S11, S12, S13 of FIG. 3 as inverse variable length encoding means for implementing inverse variable length encoding to each block of the variable length encoded signals, an orthogonal inverse transform decoding section 64 for carrying out processing of step S14 of FIG. 3 as inverse transforming means for inversely transforming spectrum signals obtained by the inverse variable encoding into each block of the time series data, and a time series sample buffer 65 and an overlap portion adding circuit 66 as blocks releasing means for releasing the block of the time series data to obtain a decoded signal.

In FIG. 4, a code train reproduced through a reproducing head 57 from the disc 56 is delivered to an EF Demodulating circuit (labeled Demodulation of EFM data) 58. The EF demodulating circuit 58 demodulates inputted code train. The demodulated code train is delivered to an ECC decoder 59, where error correction is carried out. The error corrected code train is delivered to an encoded data buffer 62 as entropy-encoded spectrum data y00, and is once (temporarily) stored into the encoded data buffer 62.

The entropy encoded spectrum data y00 stored in the encoded data buffer 62 is sent to an entropy decoding circuit 71 of the entropy decoding section 63.

The entropy decoding circuit 71 entropy-decodes the entropy-encoded spectrum data y00 delivered from the encoded data buffer 62 to send the entropy-decoded spectrum data y01 to spectrum data buffer 74. Moreover, the number of spectrum (components) (signal) y02 obtained by decoding at the entropy decoding circuit 71 is sent to a spectrum number judging circuit 72.

The spectrum data buffer 74 once (temporarily) stores the spectrum data y01. Moreover, the spectrum number judging circuit 72 judges whether or not the spectrum number y02 is equal to N/2. Insufficient number (signal) y03 is sent to an insufficient spectrum supplementing circuit 73. This insufficient spectrum supplementing circuit 73 outputs y03 number of 0s (zeros) as the insufficient spectrum (components) to the spectrum data buffer 74.

N/2 (number of) spectrum data y04 stored in the spectrum data buffer 74 is sent to an IMDCT calculating circuit 81 of the orthogonal inverse transform decoding section 64 of the succeeding stage. This IMDCT calculating circuit 81 implements IMDCT to N/2 (number of) spectrum data y04 from the spectrum data buffer 74 to apply window for inverse transform thereto to output N (number of) time series sample data y05. This time series sample data y05 is once (temporarily) stored into a time series sample buffer 65, and is then read out therefrom. The time series sample data y05 thus read out is sent to an overlap portion adding circuit 66 of the succeeding stage. It should be noted that in the case where output of the MDCT calculating circuit 41 is quantized on the encoding side, inverse quantization is carried out at the preceding stage of IMDCT circuit 81.

This overlap portion adding circuit 66 implements additive processing to data y05 stored in the time series sample buffer 65 and then read out with respect to IMDCT output data of blocks adjoining in both directions thereof to output it as time series sample data. This time series sample data is outputted from output terminal 67.

An embodiment of an efficient encoding apparatus in a more practical sense to which the above-described encoding method of the embodiment according to this invention is applied will now be described with reference to FIG. 5.

Figure 5:
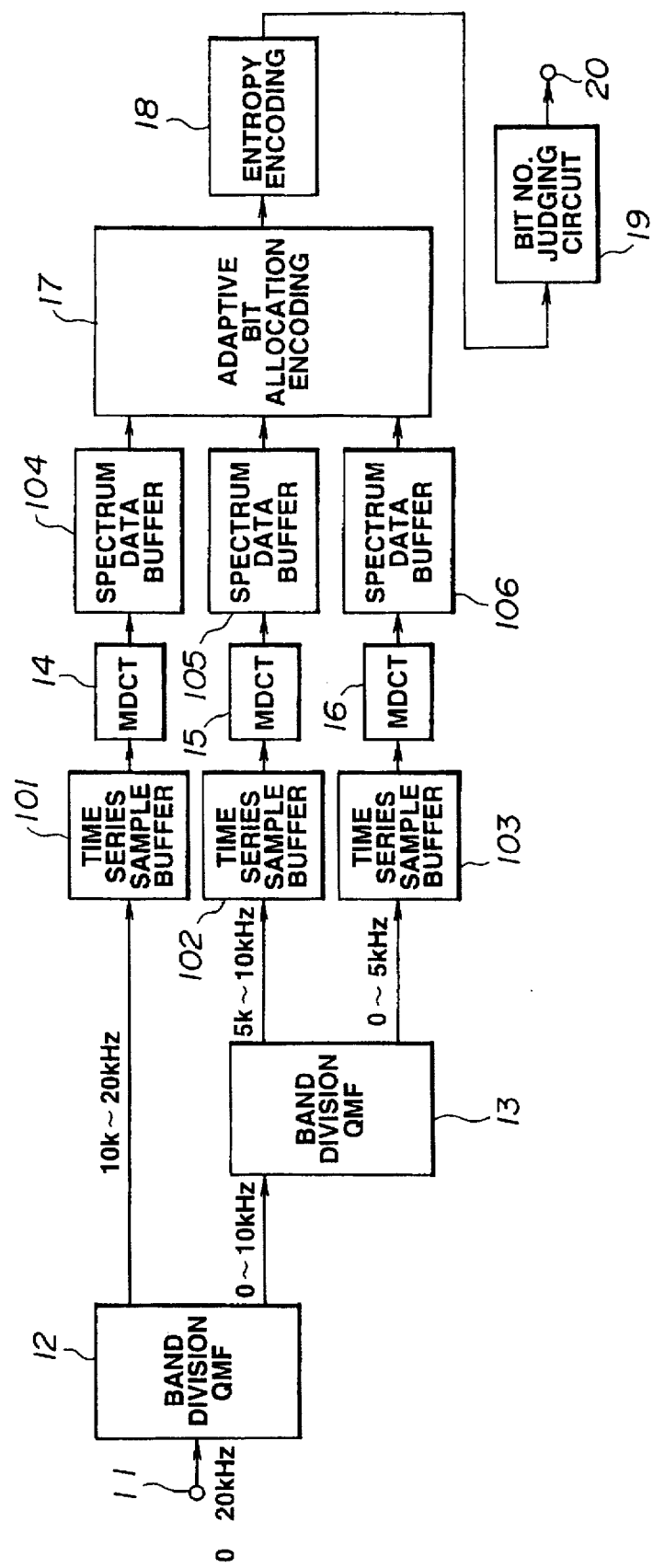
FIG. 5 is a circuit diagram showing an example of a circuit configuration of an efficient encoding apparatus in a more practical sense to which the signal transforming method MDCT is applied according to this invention.

The efficient encoding apparatus in more practical sense shown in FIG. 5 employs technology serving as core (essential part) of the so called band division encoding, adaptive transform encoding, and adaptive bit allocation. Namely, the efficient encoding apparatus of FIG. 5 divides an inputted digital signal such as Pulse Code Modulated?? (PCM) audio signal, etc., into signals in a plurality of frequency bands, and makes a selection such that as the frequency shifts to a higher frequency band side, the band widths become broader to carry out the MDCT which is orthogonal transform every respective frequency bands to bit-allocate spectrum data on the frequency base thus obtaining every so called critical bands to encode them.

In FIG. 5, an input terminal 11 is supplied with audio PCM signal of, e.g., 0~20 Kz. This input signal is divided into a signal in 0~10 kHz band and a signal in 10 k~20 kHz band by a first band division filter 12, e.g. , so called QMF, etc. Moreover, the signal in 0~10 kHz band from the band division filter 12 is divided into a signal in 0~5 kHz band and a signal in 5 k~10 kHz band by a second band division filter 13 such as the so called QMF similar to the above, etc.

The signal in 10 k~20 kHz band from the first band division filter 12 is sent to a first MDCT (Modified Discrete Cosine Transform) circuit 14 as described above which is an example of the orthogonal transform circuit through a first time series sample buffer 101 corresponding to the time series sample buffer 32 of FIG. 2. The signal in 5 k~10 kHz band from the second band division filter 13 is sent to a second MDCT circuit 15 through a second time series sample buffer 102 corresponding to the time series sample buffer 32 of FIG. 2. The signal in 0~5 kHz band from the band division filter 13 is sent to a third MDCT circuit 16 through a third time series sample buffer 103 corresponding to the time series buffer 32 of FIG. 2. Thus, these signals are caused to undergo MDCT processing.

Spectrum data or coefficient data on the frequency base obtained after having undergone MDCT processing at the respective MDCT circuits 14, 15, 16 are combined at every so called critical bands respectively through spectrum data buffers 104, 105, 106, and are then sent to an adaptive bit allocation encoding circuit 17. It is to be noted that critical bands are frequency bands divided in consideration of the hearing sense characteristic of a human being and bands that narrow band noises of the same intensity in the vicinity of a certain pure sound have when the pure sound is masked by those noises. The critical bands are such that frequency shifts to a higher frequency band, the bandwidths become broader, and the entire frequency band of 0~20 kHz is divided into, e.g., 25 critical bands.

The adaptive bit allocation encoding circuit 17 normalizes, every respective critical bands, for example, respective spectrum signals by scale factors, i.e. , the maximum values of absolute values of signals of spectrum components includes therein, and quantizes the normalized spectrum signals by a bit number such that quantizing noises are masked by signals of respective corresponding critical bands to output the quantized spectrum signals along with the scale factors determined at every respective critical bands and the number of bits used in the quantization.

Data encoded in this way is sent to an entropy encoding circuit 18 corresponding to the entropy encoding circuit 51 of FIG. 2, where entropy encoding such as block Huffman encoding, etc., is implemented thereto. Limitation of the number of bits is implemented by a bit number judging circuit 19 corresponding to the bit number judging circuit 52 of FIG. 2. The bit number limited data thus obtained is taken out through an output terminal 20. In this case, while processing at the bit number judging circuit 19 is basically similar to that of the bit judging circuit 52, an approach is employed to successively output entropy-encoded spectrum data from a lower frequency band side, whereby when that data reaches threshold at a certain critical band, outputting is stopped with respect to the spectrum data of that critical band and the spectrum data in a frequency band higher than that. The encoded data obtained from the output terminal 20 is recorded, similarly to that of FIG. 2, onto the disc 56 through the ECC encoder 53, the EFM circuit 54 and the recording head 55.

It should be noted that entropy encoding of the spectrum signals may be carried out at every respective bands, or only at a portion of the spectrum signals. Moreover, in the adaptive bit allocation operation, the spectrum signals of the respective blocks combined at every critical bands may be divided into several units to normalize every respective unites of the spectrum signals to calculate them. Thus, higher accuracy operation can be performed by the same operation word length. Furthermore, division of these bands or units may be variably carried out in dependency upon the property of the input signal.

A decoding apparatus corresponding to the above-described efficient encoding apparatus which is an efficient decoding apparatus in a more practical sense to which the above-described decoding method of the embodiment according to this invention is applied will now be described with reference to FIG. 6.

Figure 6:
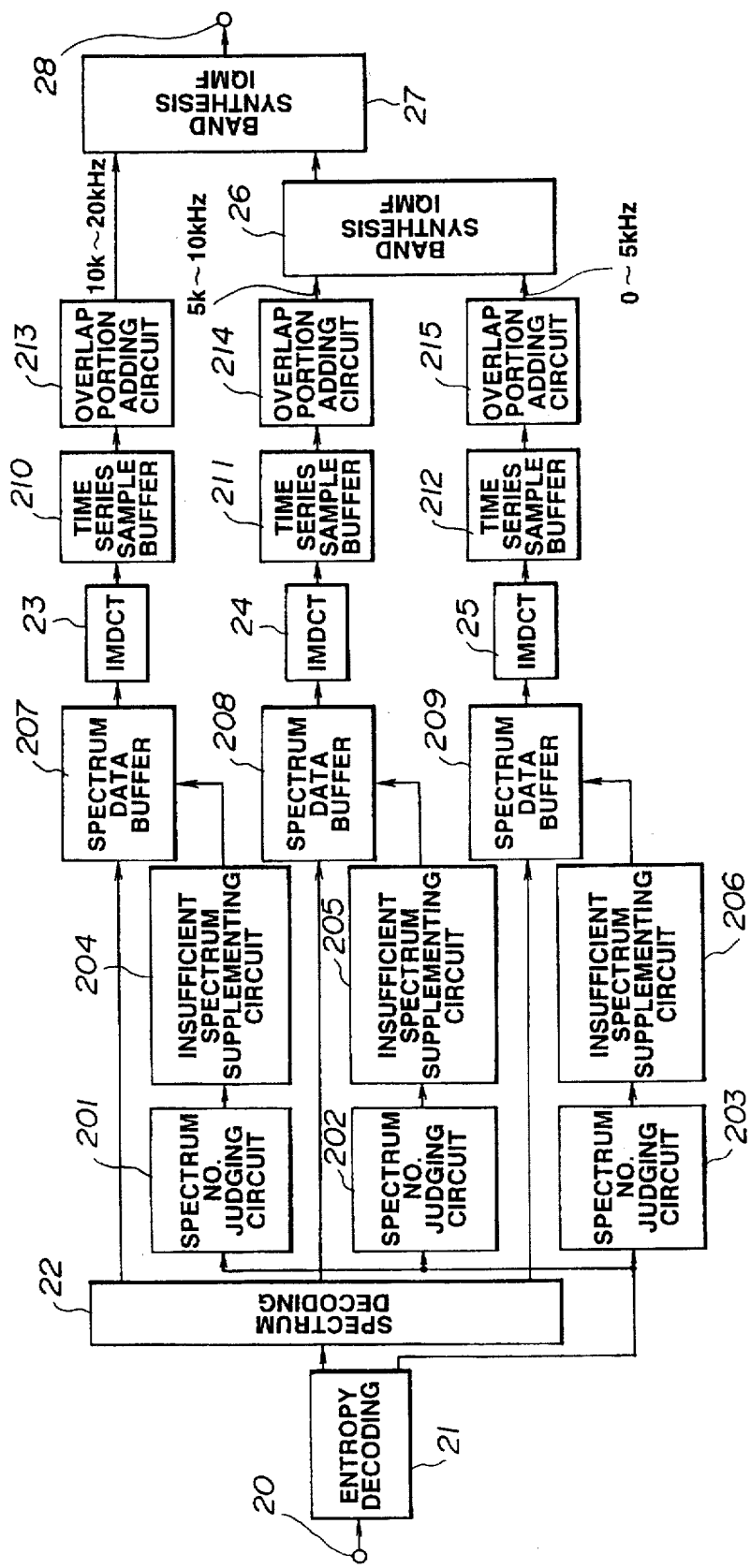
FIG. 6 is a circuit diagram showing, in a block form, an example of a circuit configuration of an efficient decoding apparatus in a more practical sense to which the signal transforming method IMDCT is applied according to this invention.

Similarly to FIG. 2, EF Demodulated and error corrected scale factor, the number of bits used in quantization, and the entropy-encoded spectrum signal which are reproduced through reproducing head 57 from the disc 56 are inputted to an input terminal 20 of FIG. 6. An Entropy decoding circuit 21 implements entropy decoding to the inputted entropy encoded data thereafter to sent this data to a spectrum decoding circuit 22. This spectrum decoding circuit 22 carries out inverse quantization and release of normalization from these data. Thus, spectrum signals are constructed. Among these spectrum signals, the spectrum signal in band of 10 k~20 kHz is passed through a first spectrum data buffer 207, and is then caused to undergo the IMDCT inverse transform processing by a first IMDCT circuit 23. Further, the spectrum signal in the band of 5 k~10 kHz is passed through spectrum data buffer 208, and is then caused to undergo IMDCT inverse transform processing by a second IMDCT circuit 24. In addition, the spectrum signal in the band of 0~5 kHz. is passed through spectrum buffer 208, and is then caused to undergo IMDCT inverse transform processing by a third IMDCT circuit 25.

Operations of spectrum number judging circuits 201, 202, 203, insufficient spectrum supplementing circuits 204, 205, 206, and the spectrum data buffers 207, 208, 209 are respectively basically similar to those of the spectrum number judging circuit 72, the insufficient spectrum supplementing circuit 73, and the spectrum data buffer 74 of FIG. 4. The spectrum data buffers 207, 208, 209 respectively once (temporarily) store spectrum data from the spectrum decoding circuit 22. Moreover, spectrum number judging circuits 201, 202, 203 respectively detect insufficient spectrum numbers from every respective bands of the spectrum numbers obtained from the entropy decoding circuit 21 to send information of insufficient spectrum numbers to the insufficient spectrum supplementing circuits 204, 205, 206. These insufficient spectrum supplementing circuits 204, 205, 206 respectively output 0 (zero) to the spectrum data buffers 207, 208, 209 in place of insufficient spectrum numbers.

Moreover, operations of time series sample buffers 210, 211, 212, and overlap portion adding circuits 213, 214, 215 are respectively basically similar to those of the time series sample buffer 65 and the overlap portion adding circuit 66 of FIG. 4. Time series sample data obtained from the IMDCT circuits 23, 24, 25 are respectively once (temporarily) stored into the time series sample buffer 210, 211, 212, and are then read out therefrom. The sample data thus read out are sent to the overlap portion adding circuits 213, 214, 215 of the succeeding stage. These overlap portion adding circuits 213, 214, 215 implement additive processing to the data stored in the time series sample buffers 210, 211, 212, and then read out, with respect to IMDCT output, data of blocks adjoining in both directions to output signal waveform data in the state divided into three frequency bands.

Among these signal waveform data in three frequency bands obtained in this way, signal waveform data of 0~5 kHz and signal waveform data of 5 k~10 kHz are synthesized by a first band synthesis (integration) circuit 26 so that it is changed into signal waveform data of 0~10 kHz. This signal waveform data of 0~10 kHz and signal waveform data of 10 k~20 kHz are synthesized at a second band synthesis (integration) circuit 27. Thus, signal waveform data over the entire frequency band is outputted from an output terminal 28.

It should be noted that this invention is not limited to the above-described embodiments, and apparatuses applied are not limited to the efficient encoding/decoding apparatuses shown in FIGS. 5 and 6, but may be applied to various transform encoding apparatus, decoding apparatus for releasing encoding, or the like.

Industrial Applicability

In this invention, with respect to each block of the input signal, the upper limit of the number of bits after having undergone encoding is determined. In a block or blocks where the number of bits above the upper limit is required, recording or transmission of spectrum signal is not carried out, thereby fixing the upper limit of necessary number of bits. Thus, not only can processing at a fixed bit rate be carried out, but also, scale of hardware can be held down to some extent also at a variable bit rate. Namely, in accordance with this invention, hardware scale can become more compact in a form such that the influence from a viewpoint of hearing sense is small without depending upon scattering of the number of bits by variable length encoding. In addition, efficient encoding and decoding can be carried out, and capacity of recording medium can be effectively utilized.

What is claimed is:

1. An encoding method, comprising the steps of: dividing an input signal into blocks;

transforming every respective block of the input signal into spectrum signals; and implementing variable length encoding to all or a portion of every block of the spectrum signals to output encoded signals;

wherein an upper limit of the number of bits of a signal encoded and outputted is set per plural blocks of the input signal, thus to stop outputting of a portion of spectrum signals in a block or blocks where the number of bits above the upper limit is required; and wherein in selection of the spectrum signal or signals of which outputting is stopped, the selection is carried out from a higher frequency band side of all spectrum signals.

2. An encoding apparatus: comprising:

blocking means for dividing an input signal into blocks;

transforming means for transforming every respective block of the input signals into spectrum signals; and variable length encoding means for implementing variable length encoding to all or a portion of the spectrum signals every respective blocks;

wherein there are provided:

upper limit setting means for setting an upper limit of the number of bits of a signal encoded and outputted per plural blocks of the input signal; and output stopping means for stopping outputting of a portion of spectrum signals in a block or blocks where the number of bits above the upper limit is required;

wherein in selection of the spectrum signal or signals of which outputting is stopped, the output stopping means carries out the selection from a higher frequency band side of all the spectrum signals.

3. A decoding method for decoding a signal encoded by an encoding method comprising the steps of dividing an input signal into blocks, and transforming every respective block of the input signal into spectrum signals, wherein in implementing variable length encoding to all or a portion of the spectrum signals every respective blocks, an upper limit of the number of bits of a signal encoded and outputted is set per blocks of the input signal, thus to stop outputting of a portion of the spectrum signals in a block or blocks where the number of bits above the upper limit is required, the decoding method comprising the steps of:

implementing inverse variable length encoding to the variable length encoded signals every blocks;

inversely transforming spectrum signals obtained by the inverse variable length encoding into time series data every blocks; and releasing the blocks of the time series data to obtain a decoded signal wherein, in the encoding method, in selection of the spectrum signal or signals of which outputting is stopped, the selection is carried out from a higher frequency band side of all the spectrum signals.

4. A decoding apparatus for decoding a signal encoded by an encoding method comprising the steps of dividing an input signal into blocks, transforming every block of the input signal into spectrum signals, wherein in implementing variable length encoding to all or a portion of each block of the spectrum signals, an upper limit of the number of bits of a signal encoded and outputted is set per plural blocks of the input signal, thus to stop outputting of a portion of spectrum signals in a block or blocks where the number of bits above the upper limit is required, the decoding apparatus comprising:

inverse variable length encoding means for implementing inverse variable length encoding to each block of the variable length encoded signals;

inverse transforming means for inversely transforming spectrum signals obtained by the inverse variable length encoding into each block of time series data; and block releasing means for releasing the blocks of the time series data to obtain a decoded signal;

wherein, in the encoding method, in selection of the spectrum signal or signals of which outputting is stopped, the selection is carried out from a higher frequency band side of all the spectrum signals.

5. A recording medium wherein an input signal is divided into blocks to transform each block of the input signal into spectrum signals, whereby in implementing variable length encoding to all or a portion of each block of the spectrum signals to record encoded spectrum signals, an upper limit of the number of bits of the signal encoded and recorded is set per plural blocks of the input signal to stop recording of a portion of spectrum signals in a block or blocks where the number of bits above the upper limit is required;

wherein, in selection of the spectrum signal or signals of which recording is stopped, the selection is carried out from a higher frequency band side of all the spectrum signals.

6. A decoding method for decoding a signal encoded by an encoding method, comprising the steps of:

dividing an input signal into blocks;

transforming signals every respective blocks into spectrum signals, wherein in implementing variable length encoding to all or a portion of the spectrum signals every respective blocks, the number of bits per each block of an outputted signal is caused to have an upper limit, thus to stop outputting of a portion of the spectrum signals in a block or blocks where the number of bits above the upper limit is required, the decoding method comprising the steps of:

implementing inverse variable length encoding to the variable length encoded signals every respective blocks;

inversely transforming spectrum signals obtained by the inverse variable length encoding into time series data every blocks; and releasing the blocks of the time series data to obtain a decoded signal;

wherein, in the decoding, with respect to a spectrum signal or signals of which outputting is stopped in the encoding, a single or plural values determined in advance are suitably virtually used as the spectrum signal or signals, thus to carry out decoding.

7. A decoding method as set forth in claim 6, wherein, in the encoding method, selection of a spectrum signal or signals of which outputting is stopped is carried out in dependency upon shape of the spectrum signals of the respective blocks.

8. A decoding method as set forth in claim 6, wherein, in the decoding, with respect to a spectrum signal or signals of which outputting is stopped in the encoding value 0 is virtually used as the spectrum signal or signals to carry out decoding.

9. A decoding method as set forth in claim 6, wherein in transform processing from the input signals into the spectrum signals in the encoding method, the input signal is divided into signals in a plurality of frequency bands, and transform processing into spectrum signals are implemented every respective bands.

10. A decoding method as set forth in claim 9, wherein, in the encoding method, the input signal is divided into signals in a plurality of frequency bands of which respective bandwidths are not uniform, and transform processing into spectrum signals are carried out every respective bands.

11. A decoding method as set forth in claim 6, wherein inverse transform processing of Modified Discrete Cosine Transform is used as transform processing from the spectrum signal into the time series data.

12. A decoding method as set forth in claim 6, wherein spectrum signals of respective blocks in the encoding method are spectrum signals divided into a plurality of units and normalized every respective units.

13. A decoding method as set forth in claim 6, wherein, in the encoding method, in selection of the spectrum signal or signals of which outputting is stopped, the selection is carried out from a higher frequency band side of all spectrum signals.

14. A decoding method as set forth in claim 6, wherein, in the encoding method, entropy code is used as the variable length code.

15. A decoding method as set forth in claim 14, wherein, in the encoding method, block Huffman code is used as the variable length code.

16. A decoding method as set forth in claim 14, wherein, in the encoding method, a plurality of code tables of the variable length codes are prepared to select a code table where the number of bits required for encoding becomes minimum in respective blocks to output spectrum signals along with a discrimination signal of the selected code table; and, in the inverse variable length encoding, a plurality of code tables of inverse variable length codes are prepared to decode the encoded spectrum signal or signals all or a portion of which are delivered, on the basis of the discrimination signal of the code table with respect to respective blocks.

17. A decoding apparatus for decoding a signal encoded by an encoding method comprising the steps of dividing an input signal into blocks, transforming signals every blocks into spectrum signals, wherein in implementing variable length encoding to all or a portion of the spectrum signals every blocks, the number of bits per each block of an outputted signal is caused to have an upper limit, thus to stop outputting of a portion of spectrum signals in a block or blocks where the number of bits above the upper limit is required, the decoding apparatus comprising:

inverse variable length encoding means for implementing inverse variable length encoding to the variable length encoded signals every blocks;

inverse transforming means for inversely transforming spectrum signals obtained by the inverse variable length encoding into time series data every blocks; and block releasing means for releasing the blocks of the time series data to obtain a decoded signal;

wherein, in the decoding, with respect to a spectrum signal or signals of which outputting is stopped in the encoding, a single or plural values determined in advance are suitably virtually used as the spectrum signal or signals, thus to carry out decoding.

18. A decoding apparatus as set forth in claim 17, wherein, in the encoding method, selection of the spectrum signal or signals of which outputting is stopped is carried out in dependency upon shape of spectrum signals of the respective blocks.

19. A decoding apparatus as set forth in claim 17, wherein, in the decoding, with respect to a spectrum signal or signals of which outputting is stopped in the encoding, value 0 is virtually used as the spectrum signal or signals, thus to carry out decoding.

20. A decoding apparatus as set forth in claim 17, wherein, in transform processing from the input signal into spectrum signals in the encoding method, the input signal is divided into signals in a plurality of frequency bands, and transform processing into spectrum signals are implemented every respective bands.

21. A decoding apparatus as set forth in claim 20, wherein, in the encoding method, the input signal is divided into signals in a plurality of frequency bands of which respective bandwidths are not uniform, and transform processing into spectrum signals are carried out every respective bands.

22. A decoding apparatus as set forth in claim 17, wherein inverse transform processing of Modified Discrete Cosine Transform is used as transform processing from the spectrum signals into the time series data.

23. A decoding apparatus as set forth in claim 17, wherein Spectrum signals of respective blocks in the encoding method are spectrum signals divided into a plurality of units and normalized every respective units.

24. A decoding apparatus as set forth in claim 17, wherein, in the encoding method, in selection of the spectrum signal or signals of which outputting is stopped.

25. A decoding apparatus as set forth in claim 17, wherein, in the encoding method, entropy code is used as the variable length code.

26. A decoding apparatus as set forth in claim 25, wherein, in the encoding method, block Huffman code is used as the variable length code.

27. A decoding apparatus as set forth in claim 25, wherein, in the encoding method, a plurality of code tables of the variable length codes are prepared to select a code block where the number of bits necessary for encoding becomes minimum with respect to each block to output spectrum signals along with a discrimination signal of the selected code table; and the inverse variable length encoding means is operative to prepare a plurality of code tables of inverse variable coded to decode the encoded spectrum signals all or a portion of which are delivered, on the basis of discrimination signals of the code tables with respect to respective blocks.

28. A recording medium wherein an input signal is divided into blocks to transform signals every blocks into spectrum signals, whereby in implementing variable length encoding to all or a portion .of spectrum signals every blocks to record encoded spectrum signals, the number of bits per each block of a signal encoded and recorded is caused to have an upper limit to stop recording of a portion of spectrum signals in a block or blocks where the number of bits above the upper limit is required; and wherein, in later decoding, with respect to a spectrum signal or signals of which recording operation is stopped, decoding is carried out by virtually using value 0 as the spectrum signal or signals.

29. A recording medium wherein an input signal is divided into blocks to transform signals every blocks into spectrum signals, whereby in implementing variable length encoding to all or a portion of spectrum signals every blocks upper limit to stop recording of a portion of spectrum signals in a block or blocks where the number of bits above the upper limit is required; and wherein, with respect to a spectrum signal or signals of which recording operation is stopped, in later decoding, decoding is carried out by suitably virtually using a single or plural values determined in advance as the spectrum signal or signals.

30. A recording medium as set forth in claim 29, wherein selection of the spectrum signal or signals of which recording is stopped is carried out in dependency upon shape of the spectrum signals of the respective blocks.

31. A recording medium as set forth in claim 29, wherein, in transform processing from the input signal into the spectrum signals in the encoding, the input signal is divided into signals in a plurality of frequency bands, and transform processing into spectrum signals are implemented every respective bands.

32. A recording medium as set forth in claim 31, wherein, in the encoding, the input signal is divided into signals in a plurality of frequency bands of which respective bandwidths are not uniform, and transform processing into spectrum signals are implemented every respective bands.

33. A recording medium as set forth in claim 29, wherein, in the encoding, Modified Discrete Cosine Transform processing is used as transform processing from the input signal into the spectrum signals.

34. A recording medium as set forth in claim 29, wherein spectrum signals of respective blocks in the encoding are spectrum signals divided into a plurality of units and normalized every respective units.

35. A recording medium as set forth in claim 29, wherein, in selection of the spectrum signal or signals of which recording is stopped, the selection is carried out from a higher frequency band side of all spectrum signals.

36. A recording medium as set forth in claim 29, wherein, in the encoding, entropy code is used as the variable length code.

37. A recording medium as set forth in claim 36, wherein, in the encoding, block Huffman code is used as the variable length code.

38. A recording medium as set forth in claim 36, wherein, in the encoding method, a plurality of code tables of the variable length codes are prepared to select a code block where the number of bits necessary for encoding becomes minimum in respective blocks to record all or a portion of spectrum signals along with a discrimination signal of the selected code table.

* * * * *